(12) United States Patent
Dolmaya et al.

(10) Patent No.: US 11,383,688 B2
(45) Date of Patent: Jul. 12, 2022

(54) BRAKE SYSTEM FOR MOTOR VEHICLES

(71) Applicant: Continental Teves AG & Co. oHG, Frankfurt am Main (DE)

(72) Inventors: Joseph Dolmaya, Oberursel (DE); Dieter Dinkel, Schwalbach (DE)

(73) Assignee: Continental Teves AG & Co. oHG

( * ) Notice: Subject to any disclaimer, the term of this patent is extended or adjusted under 35 U.S.C. 154(b) by 258 days.

(21) Appl. No.: 16/636,472

(22) PCT Filed: Jul. 26, 2018

(86) PCT No.: PCT/EP2018/070270
§ 371 (c)(1),
(2) Date: Feb. 4, 2020

(87) PCT Pub. No.: WO2019/030005
PCT Pub. Date: Feb. 14, 2019

(65) Prior Publication Data
US 2020/0189546 A1 Jun. 18, 2020

(30) Foreign Application Priority Data
Aug. 9, 2017 (DE) .......................... 102017213858.0

(51) Int. Cl.
*B60T 13/74* (2006.01)
*B60T 13/68* (2006.01)
(Continued)

(52) U.S. Cl.
CPC ............ *B60T 13/686* (2013.01); *B60T 13/18* (2013.01); *B60T 17/04* (2013.01); *B60T 13/165* (2013.01);
(Continued)

(58) Field of Classification Search
CPC ...... B60T 13/686; B60T 13/74; B60T 13/745; B60T 8/4013; B60T 2270/402; B60T 2270/413
See application file for complete search history.

(56) References Cited

U.S. PATENT DOCUMENTS 8,527,174 B2   9/2013 Watanabe et al.
9,145,119 B2 *  9/2015 Biller ...................... B60T 13/58
(Continued)

FOREIGN PATENT DOCUMENTS

CN       1880137 A    12/2006
CN     102245448 A    11/2011
(Continued)

OTHER PUBLICATIONS

Korean Office Action for Korean Application No. 10-2020-7003609, dated Feb. 8, 2021, with partial English translation, 10 pages.
(Continued)

*Primary Examiner* — Bradley T King
(74) *Attorney, Agent, or Firm* — RatnerPrestia

(57) ABSTRACT

A motor vehicle brake system includes at least four hydraulically actuatable wheel brakes, a main pressure medium reservoir, at atmospheric pressure, a first electrohydraulic brake control device, which, for each of the four wheel brakes, includes a wheel-specific outlet, and a second electrohydraulic brake control device, which, for each of the four wheel brakes, includes a wheel-specific inlet, connected to the wheel-specific outlet of the first brake control device, a wheel-specific wheel outlet, connected to the wheel brake, and a hydraulic wheel connecting line, connecting the inlet to the wheel outlet. The second brake control device includes a first pump with a first pressure side and first suction side. The first pressure side connected to a first and second wheel connecting line, and a second pump with a
(Continued)

second pressure side and second suction side. The second pressure side connected to the third and the fourth wheel connecting line.

17 Claims, 6 Drawing Sheets

(51) Int. Cl.
    *B60T 13/18*     (2006.01)
    *B60T 17/04*     (2006.01)
    *B60T 13/16*     (2006.01)
    *B60T 13/62*     (2006.01)

(52) U.S. Cl.
    CPC ......... *B60T 13/62* (2013.01); *B60T 2270/402* (2013.01); *B60T 2270/82* (2013.01)

(56) References Cited

U.S. PATENT DOCUMENTS

| | | | |
|---|---|---|---|
| 10,391,994 B2 | 8/2019 | Drumm et al. | |
| 2006/0284477 A1 | 12/2006 | Yang | |
| 2013/0093237 A1* | 4/2013 | Dinkel | B60T 8/4872 303/10 |
| 2014/0110997 A1* | 4/2014 | Biller | B60T 7/12 303/9.62 |
| 2014/0225425 A1* | 8/2014 | Drumm | B60T 13/146 303/9.75 |
| 2015/0291137 A1 | 10/2015 | Takeuchi et al. | |
| 2016/0272178 A1* | 9/2016 | Feigel | B60T 8/4013 |
| 2016/0339885 A1* | 11/2016 | Linhoff | B60T 17/18 |
| 2017/0129468 A1* | 5/2017 | Besier | B60T 8/4086 |
| 2017/0129469 A1* | 5/2017 | Besier | B60T 13/74 |
| 2017/0274884 A1* | 9/2017 | Besier | B60T 13/142 |
| 2017/0282877 A1* | 10/2017 | Besier | B60T 13/142 |
| 2017/0361825 A1* | 12/2017 | Drumm | B60T 13/142 |
| 2019/0016321 A1* | 1/2019 | Dinkel | B60T 8/4081 |
| 2019/0039583 A1* | 2/2019 | Besier | B60T 8/321 |
| 2020/0139949 A1* | 5/2020 | Dolmaya | B60T 13/745 |

FOREIGN PATENT DOCUMENTS

| | | |
|---|---|---|
| CN | 104973030 A | 10/2015 |
| DE | 102014225954 A1 | 6/2016 |
| DE | 102014225956 A1 | 6/2016 |
| DE | 102016201047 A1 | 8/2016 |
| DE | 102016203111 A1 | 9/2016 |
| WO | 2016096538 A1 | 6/2016 |
| WO | 2016120292 A1 | 8/2016 |

OTHER PUBLICATIONS

Chinese Office Action for Chinese Application No. 201880051032.0, dated Sep. 22, 2021, with translation, 12 pages.
Korean Decision for Grant of Patent for Korean Application No. 10-2020-7003609, dated Aug. 11, 2021 with translation, 7 pages.
German Search Report for German Application No. 10 2017 213 858.0, with partial English translation, dated Jun. 19, 2018, 9 pages.
International Search Report and Written Opinion for International Application PCT/EP2018/070270, dated Nov. 6, 2018, 7 pages.

\* cited by examiner

BRAKE SYSTEM FOR MOTOR VEHICLES

CROSS REFERENCE TO RELATED APPLICATIONS

This application is the U.S. National Phase Application of PCT International Application No. PCT/EP2018/070270, filed Jul. 26, 2018, which claims priority to German Patent Application No. 10 2017 213 858.0, filed Aug. 9, 2017, the contents of such applications being incorporated by reference herein.

FIELD OF THE INVENTION

The invention relates to a brake system for motor vehicles.

BACKGROUND OF THE INVENTION

Hydraulic brake systems are widely used in motor vehicles. It is to be expected that motor vehicle brake systems that are suitable for motor vehicles driving in an automated manner will be used in future. Fundamentally, these brake systems must be electronically controllable systems or "brake-by-wire" systems. This means that a brake demand can be requested by means of electronic or electric control signals and implemented by the system without the action of the driver. Particularly in systems of this kind, safety reasons dictate that sufficiently high availability of the brake system and also of the power-operated braking function must be ensured by means of wheel-specific control.

In WO 2016/096538 A1, incorporated herein by reference, there is a description of a brake system for motor vehicles which comprises four hydraulically actuatable wheel brakes, a pressure medium reservoir under atmospheric pressure, a first electrohydraulic brake control device, which has a wheel-specific output pressure port for each of the four wheel brakes, and a second electrohydraulic brake control device arranged downstream of the first brake control device. For each of the four wheel brakes, the second brake control device comprises a wheel-specific input pressure port, a wheel-specific output pressure port, a pump and valves, wherein the hydraulic buildup for each wheel brake is the same. Accordingly, the previously known second brake control device is of four-circuit construction with four identical (wheel) brake circuits. Although the previously known brake system satisfies high requirements in respect of the availability of the setting of wheel-specific brake pressures, it is relatively complex and thus expensive.

Brake systems for motor vehicles having four hydraulically actuatable wheel brakes are known, for example, from DE 10 2016 201 047 A1, incorporated herein by reference, said systems comprising a first electrohydraulic brake control device and a second electrohydraulic brake control device, arranged downstream of the first brake control device, wherein the second brake control device is of less complex design and comprises just two pumps, one for each brake circuit with two wheel brakes. In this case, however, the first and the second brake control device are connected to one another via just two hydraulic connections. That is to say that the first brake control device has just two brake-circuit-specific output pressure ports, and the second brake control device comprises just one (brake-circuit-specific) input pressure port for each of its two brake circuits.

SUMMARY OF THE INVENTION

An aspect of the present invention is an alternative brake system for motor vehicles having at least four hydraulically actuatable wheel brakes which satisfies high requirements in respect of the availability of the setting of wheel-specific or at least axle-specific brake pressures and is suitable for automated driving.

An aspect of the invention is based on the concept of combining a first electrohydraulic brake control device having wheel-specific outlets to a downstream second electrohydraulic brake control device having wheel-specific inlets and wheel-specific outlets, wherein the second brake control device comprises a first pump, the pressure side of which is connected to a first and a second wheel connecting line of the four wheel connecting lines, and a second pump, the pressure side of which is connected to the two other wheel connecting lines.

An aspect of the invention offers the advantage that it satisfies the functional requirements on a brake system for highly automatic driving and is nevertheless relatively simple and inexpensive.

It is preferable if the first pressure side is not connected hydraulically to the two other wheel connecting lines, namely the third and the fourth wheel connecting line (in the sense of the possibility of a buildup of brake pressure).

It is preferable if the second pressure side is not connected hydraulically to the first and the second wheel connecting line (in the sense of the possibility of a buildup of brake pressure).

The second brake control device preferably comprises an inlet valve, closed when deenergized, for each wheel brake in order to be able to implement a pressure holding phase for each wheel brake in a wheel-specific manner.

The pressure side of each of the pumps is preferably connected directly to at least one of the associated wheel brakes via an inlet valve which is closed when deenergized. A highly dynamic pressure change is thereby possible at least these wheel brakes since the flow resistance of the connection between the pressure side and the wheel brake is low.

The term "directly connected (hydraulically)" is interpreted to mean that no further switchable valve (apart from the inlet valve) is arranged in the hydraulic connection.

The pressure side of each of the pumps is preferably connected directly to both associated wheel brakes via an inlet valve which is closed when deenergized.

According to a preferred embodiment of the brake system according to the invention, the first brake control device comprises a pressure control valve assembly for setting wheel-specific pressures at the wheel-specific outlets of the first brake control device and comprises an electrically controllable pressure source for building up a brake pressure.

It is furthermore preferred if the first brake control device comprises a brake master cylinder that can be actuated by a brake pedal.

According to a preferred embodiment of the invention, the first brake control device is embodied as a structural unit in the form of a brake control unit having an electronic open-loop and closed-loop control unit and a hydraulic open-loop and closed-loop control unit. The electronic open-loop and closed-loop control unit is particularly preferably designed to control the pressure control valve assembly and the electrically controllable pressure source. Thus, the second brake control device can simply be added as an option to the first brake control device (modular principle).

The second brake control device is preferably embodied as a structural unit in the form of a brake control unit having a second electronic open-loop and closed-loop control unit and a second hydraulic open-loop and closed-loop control unit, wherein the second electronic open-loop and closed-loop control unit is designed for controlling the first and the second pump.

To increase the availability of the brake system, the brake system preferably comprises at least two mutually independent electric energy sources. As a particular preference, the first brake control unit is supplied with electric energy by a first electric energy source, and the second brake control device is supplied with electric energy by a second electric energy source.

The second brake control device preferably comprises a first and a second pressure medium reservoir under atmospheric pressure, which are integrated into the second brake control device, thus ensuring that pressure medium for the pumps is held ready in the second brake control device.

The first and the second pressure medium reservoir are preferably connected to the main pressure medium reservoir. There is thus always sufficient pressure medium in the second brake control device.

The first and the second pressure medium reservoir are preferably connected to one another directly via an equalization line arranged in the second brake control device.

According to a preferred embodiment, the first suction side is connected hydraulically to the first pressure medium reservoir via a first intake valve, and the second suction side is connected to the second pressure medium reservoir via a second intake valve. Thus, each pump has access to a (dedicated) internal pressure medium reservoir.

According to another preferred embodiment, the first pressure side is connected hydraulically to the second pressure side. Thus, the first pump is additionally connected hydraulically to the third and the fourth wheel connecting line, and the second pump is additionally connected hydraulically to the first and the second wheel connecting line. The brake control device can therefore perform a single-circuit pressure buildup.

The first suction side is preferably connected hydraulically to the second suction side, thus enabling each of the two pumps to draw in pressure medium from both pressure medium reservoirs.

The first suction side and the second suction side are preferably connected to the first and the second pressure medium reservoir via a single intake valve. In this way, it is possible to eliminate a switchable valve.

According to a preferred embodiment, the first pressure side is connected hydraulically to the first wheel connecting line via a first inlet valve and to the second wheel connecting line via a second inlet valve. As a particular preference, the pressure side of the first pump is connected directly to the first wheel brakes via the first inlet valve, which is closed when deenergized, and is connected directly to the second wheel brake via the second inlet valve, which is closed when deenergized. In this way, a highly dynamic pressure buildup is possible at the first wheel brake assigned to the first wheel connecting line and at the second wheel brake assigned to the second wheel connecting line.

The first wheel connecting line is connected to the first pressure medium reservoir via a first outlet valve, and the second wheel connecting line is connected to the first pressure medium reservoir via a second outlet valve. Thus, wheel-specific pressure reduction phases are possible on these wheel brakes, particularly preferably on the front axle of the vehicle.

The second pressure side is preferably connected to the third wheel connecting line via a third inlet valve and to the fourth wheel connecting line via a fourth inlet valve. As a particular preference, the pressure side of the second pump is connected directly to the third wheel brakes via the third inlet valve, which is closed when deenergized, and is connected directly to the fourth wheel brake via the fourth inlet valve, which is closed when deenergized. In this way, a highly dynamic pressure buildup is possible at the third wheel brake assigned to the third wheel connecting line and at the fourth wheel brake assigned to the fourth wheel connecting line.

The third wheel connecting line is preferably connected to the second pressure medium reservoir via a third outlet valve, and the fourth wheel connecting line is connected to the second pressure medium reservoir via a fourth outlet valve. Thus, wheel-specific pressure reduction phases are possible on these wheel brakes, possibly in addition.

The second pressure side is preferably connected hydraulically to the third wheel connecting line via a third inlet valve, and the third wheel connecting line is connected hydraulically to the fourth wheel connecting line via a fourth inlet valve. In this way, it is only possible for a pressure modulation to take place jointly at the two (third and fourth) wheel brakes assigned to the third and fourth wheel connecting lines, but, in recompense, the brake system has fewer switchable valves since it is possible to dispense with a further outlet valve in this circuit.

The third wheel connecting line is preferably connected to the second pressure medium reservoir via a third outlet valve. The (third) outlet valve assigned to the second pump is thus sufficient for pressure reduction phases at the third and fourth wheel brakes.

According to another preferred embodiment of the invention, the first pressure side is connected to the second wheel connecting line via a second inlet valve and the second wheel connecting line is connected to the first wheel connecting line via a first inlet valve. In this way, it is only possible for a pressure modulation to take place jointly at the two (first and second) wheel brakes assigned to the first and second wheel connecting lines, but, in recompense, the brake system has fewer switchable valves since it is possible to dispense with a further outlet valve in this circuit.

The second wheel connecting line is preferably connected to the first pressure medium reservoir via a second outlet valve. The (second) outlet valve assigned to the first pump is thus sufficient for pressure reduction phases at the first and second wheel brakes.

It is preferred if an isolating valve which is open when deenergized and is advantageously suitable for analog control or is of analogized design is arranged in each of the wheel connecting lines. The isolating valves allow hydraulic isolation of the first electrohydraulic brake control device in the case of a pressure buildup by means of the second electrohydraulic brake control device.

A check valve that blocks flow in the direction of the first brake control device can be connected in parallel with each isolating valve. If the first brake control device is embodied in such a way that the driver can build up a brake pressure at the wheel-specific outlets in a deenergized state of the first brake control device, the second brake control device preferably does not comprise such check valves. If the first brake control device is embodied in such a way that the driver cannot build up a brake pressure at the wheel-specific outlets in a deenergized state of the first brake control device, the second brake control device preferably does comprise such check valves.

BRIEF DESCRIPTION OF THE DRAWINGS

Further preferred embodiments of the invention will emerge from the dependent claims and the following description with reference to figures.

In the drawing, in each case schematically.

DETAILED DESCRIPTION OF THE PREFERRED EMBODIMENTS

Figure 1:
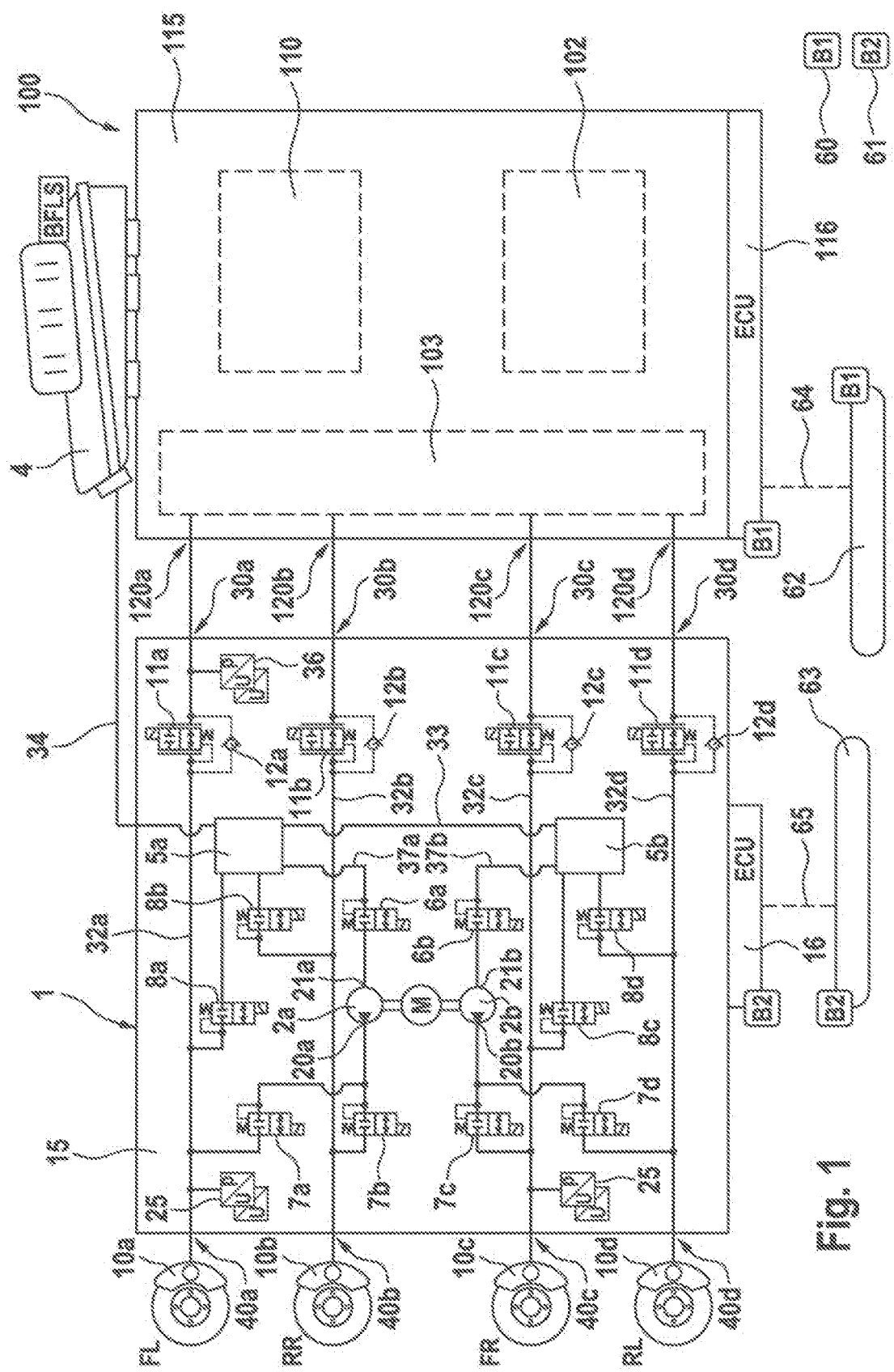
FIG. 1 shows a first exemplary embodiment of a brake system according to the invention.

FIG. 1 schematically illustrates a first exemplary embodiment of a brake system according to the invention for motor vehicles. The brake system comprises four hydraulically actuatable wheel brakes 10a-10d, a first electrohydraulic brake control device 100, which, for each of the four wheel brakes 10a-10d, comprises a wheel-specific outlet (outlet port according to the example) 120a-120d, a main pressure medium reservoir 4 under atmospheric pressure, and a second electrohydraulic brake control device 1. For each of the four wheel brakes 10a-10d, the second brake control device 1 comprises a wheel-specific inlet (inlet port according to the example) 30a-30d, which is connected to the wheel-specific outlet 120a-120d, assigned to the corresponding wheel brake 10a-10d, of the first brake control device 100, a wheel-specific wheel outlet (wheel outlet port according to the example) 40a-40d, which is connected to the corresponding wheel brake 10a-10d, and a hydraulic wheel connecting line 32a-32d, which connects the inlet 30a-30d to the wheel outlet 40a-40d. That is to say that the brake control device 1 is arranged hydraulically in series between the brake control device 100 and the wheel brakes 10a-10d.

The second brake control device 1 furthermore comprises a first pump 2a having a pressure side 20a and a suction side 21a and a second pump 2b having a pressure side 20b and a suction side 21b. The pressure side 20a of the pump 2a is connected to two of the four wheel connecting lines 32a-32d, according to the example to wheel connecting line 32a and wheel connecting line 32b, while the pressure side 20b is connected to the two other wheel connecting lines, according to the example to wheel connecting line 32c and wheel connecting line 32d.

The pumps 2a, 2b are driven by a common electric motor M.

A first and a second pressure medium reservoir 5a, 5b, each under atmospheric pressure, are integrated into the second brake control device 1. The pressure medium reservoirs 5a, 5b are advantageously connected to the main pressure medium reservoir 4. According to the example, pressure medium reservoir 5a is connected hydraulically (directly) to the main pressure medium reservoir 4 (via an equalization line 34), and pressure medium reservoir 5b is connected hydraulically to pressure medium reservoir 5a within the brake control device 1 via an equalization line 33. Thus, only one tank port is required on the brake control device 1. As an alternative, the pressure medium reservoirs 5a and 5b can be connected hydraulically (directly) to the main pressure medium reservoir 4 via separate equalization lines.

A pressure medium reservoir 5a, 5b integrated into the brake control device 1 offers the advantage that pressure medium is held ready in the device 1 and can be drawn directly out of the pressure medium reservoir. In this way, flow resistances are minimized and the availability of pressure medium for building up pressure by means of the second brake control device 1 is increased.

The first pump 20a is assigned the first pressure medium reservoir 5a, and the second pump 20b is assigned the second pressure medium reservoir 5b.

According to the example, the suction side 21a, 21b of each pump 2a, 2b is connected to the associated pressure medium reservoir 5a, 5b via a separate hydraulic connecting line 37a, 37b having an electrically actuatable intake valve 6a, 6b. The intake valves 6a, 6b are advantageously designed to be closed when deenergized.

According to the example, the first pump 2a can draw in pressure medium only from the (first) pressure medium reservoir 5a, and the second pump 2b can draw in pressure medium only from the (second) pressure medium reservoir 5b.

According to the example, the wheel brakes 10a (associated with wheel connecting line 32a) and 10b (associated with wheel connecting line 32b) assigned to the first pump 2a are assigned to the left-hand front wheel FL and the right-hand rear wheel RR. The wheel brakes 10c (associated with wheel connecting line 32c) and 10d (associated with wheel connecting line 32d) assigned to the second pump 2b are assigned to the right-hand front wheel FR and the left-hand rear wheel RL (diagonal circuit split).

For each wheel brake 10a-10d, the second brake control device 1 comprises an electrically actuatable isolating valve 11a-11d, which is arranged in the hydraulic connection (i.e. wheel connecting line 32a-32d) between the inlet 30a-30d and the wheel outlet 40a-40d. By means of the isolating valve 11a-11d, it is possible, for example, for the second brake control device 1 to be isolated hydraulically from the first brake control device 100. The isolating valves 11a-11d are advantageously designed to be open when deenergized, so that if there is a failure of the power supply of the second brake control device 1, the wheel-specific wheel brake pressures provided by the first brake control device 100 are passed through by the brake control device 1 and applied at the wheel outlets 40a-40d. According to the example, the isolating valves 11a-11d are analogized or designed for analog control.

As an option, respective check valves 12a-12d that open in the direction of the wheel brake 10a-10d can be connected in parallel with the isolating valves 11a-11d, with the result that an inlet pressure at an inlet port 30a-30d which is greater than the associated wheel brake pressure in the second brake control device 1 is passed onto the wheel brake 10a-10d, irrespective of the state of activation of the isolating valve 11a-11d.

For each wheel brake 10a-10d, the second brake control device 1 comprises an inlet valve 7a-7d, which is closed when deenergized.

According to the example, the pressure side 20a of pump 2a is connected to the first wheel connecting line 32a via the first inlet valve 7a and is connected to the second wheel connecting line 32b via the second inlet valve 7b. The pressure side 20b of pump 2b is connected to the third wheel connecting line 32c via the third inlet valve 7c and is connected to the fourth wheel connecting line 32d via the fourth inlet valve 7d. Thus, according to the example, the pressure side 20a or 20b of each pump 2a or 2b is connected (directly) via a single inlet valve, which is closed when deenergized, to each of the two wheel brakes 10*a*, 10*b* and 10*c*, 10*d* associated therewith.

To reduce wheel brake pressure, e.g. during an anti-lock control process, an outlet valve 8*a*-8*d*, which is advantageously closed when deenergized, is provided for each wheel brake 10*a*-10*d* according to the example. For each wheel brake 10*a*-10*d*, the outlet pressure port 40*a*-40*d* and thus the wheel brake can be connected via the outlet valve 8*a*-8*d* to one of the pressure medium reservoirs 5*a*, 5*b*. According to the example, the first wheel connecting line 32*a* is connected via a first outlet valve 8*a* and the second wheel connecting line 32*b* via a second outlet valve 8*b* to the first pressure medium reservoir 5*a*, while the third wheel connecting line 32*c* is connected via a third outlet valve 8*c* and the fourth wheel connecting line 32*d* via a fourth outlet valve 8*d* to the second pressure medium reservoir 5*b*.

According to the example, a pressure sensor 25 for determining the pressure at the associated wheel outlets (according to the example 40*a*, 40*c*) is provided in the brake control device 1 for one of the wheel brakes per pump 2*a*, 2*b*, according to the example for wheel brakes 10*a* and 10*c*. In addition, according to the example, brake control device 1 comprises a pressure sensor 36 for determining the pressure at one of the inlet ports (according to the example 30*a*).

According to the example, the first brake control device 100 comprises a pressure control valve assembly 103 for setting wheel-specific pressures at the wheel-specific outlets 120*a*-120*d*. The pressure control valve assembly 103 comprises an inlet valve and an outlet valve for each wheel brake 10*a*-10*d*, for example. The first brake control device 100 is preferably a power-operated "by-wire" brake system known per se, which comprises an electrically controllable pressure source 102 for the electrically controlled buildup of brake pressure. In order to allow emergency actuation of the brake system by the driver in the event of a total failure of the electric power supply of the brake system ("hydraulic fallback level"), the first brake control device 100 also comprises, according to the example, a brake master cylinder which can be actuated by a brake pedal and which is indicated in highly schematic form in the figures by reference sign 110.

According to the example, brake control device 1 is embodied as an independent construction unit or module, e.g. as a brake control unit having an electronic open-loop and closed-loop control unit (ECU) 16 and a hydraulic open-loop and closed-loop control unit (HCU) 15.

Brake control device 100 is likewise embodied as an independent construction unit or module, e.g. as a brake control unit having an electronic open-loop and closed-loop control unit (ECU) 116 and a hydraulic open-loop and closed-loop control unit (HCU) 115.

As an alternative, the hydraulic components of the brake control device 100 and 1 can also be arranged in a common module, but it is advantageous if, in that case too, two corresponding independent electronic open-loop and closed-loop control units 16 and 116 are provided.

To supply the brake system with electric energy, two mutually independent electric energy sources 60, 61 are provided. According to the example, the first brake control device 100 is supplied by the first electric energy source 60, and the second brake control device 1 is supplied by the second electric energy source 61.

To enable the brake system to be used for motor vehicles driving in an automated manner, two independent vehicle control units 62, 63, which transmit the braking demands of an autopilot function to the brake system, are provided according to the example. Vehicle control unit 62 is connected to the electronic open-loop and closed-loop control unit 116 of the brake control device 100 via a data bus 64. Vehicle control unit 63 is connected to the electronic open-loop and closed-loop control unit 16 of the brake control device 1 via a data bus 65.

According to the example, apart from the electronic open-loop and closed-loop control unit 116 of the first brake control device 100, the associated vehicle control unit 62 is also supplied with electric energy by the first electric energy source 60 (denoted by B1). In corresponding fashion, the vehicle control unit 66, like the electronic open-loop and closed-loop control unit 16 is supplied by the second electric energy source 61 (denoted by B2).

According to the example, the first brake control device 100 (regular main braking module) performs the system pressure buildup and the provision of wheel-specific wheel brake pressures in the normal, in particular fault-free, braking mode, and the second brake control device 1 stands ready in the event that the brake control device 100 fails partially or completely. In this situation, the brake control device 1 performs the pressure buildup by means of the pumps 2*a*, 2*b*. Brake control device 1 can build up and modulate pressure in a wheel-specific manner by means of the valves 7*a*-7*d*, 8*a*-8*d* under electric control, e.g. independently of the driver.

The brake system according to the example, shown in FIG. 1, offers the advantage that a dual-circuit pressure buildup is possible by means of the second brake control device 1. In this case, individual pressure modulation at each wheel brake 10*a*-10*d* is possible. Each pump 2*a*, 2*b* has access to a (dedicated) internal pressure medium reservoir. According to the example, the second brake control device 1 comprises fourteen electrically actuatable valves.

The brake systems in the exemplary embodiments shown in FIGS. 2 to 6 correspond in many components to the exemplary embodiment shown in FIG. 1, for which reason it is essentially the deviations or differences between the individual exemplary embodiments which are explored below.

Figure 2:
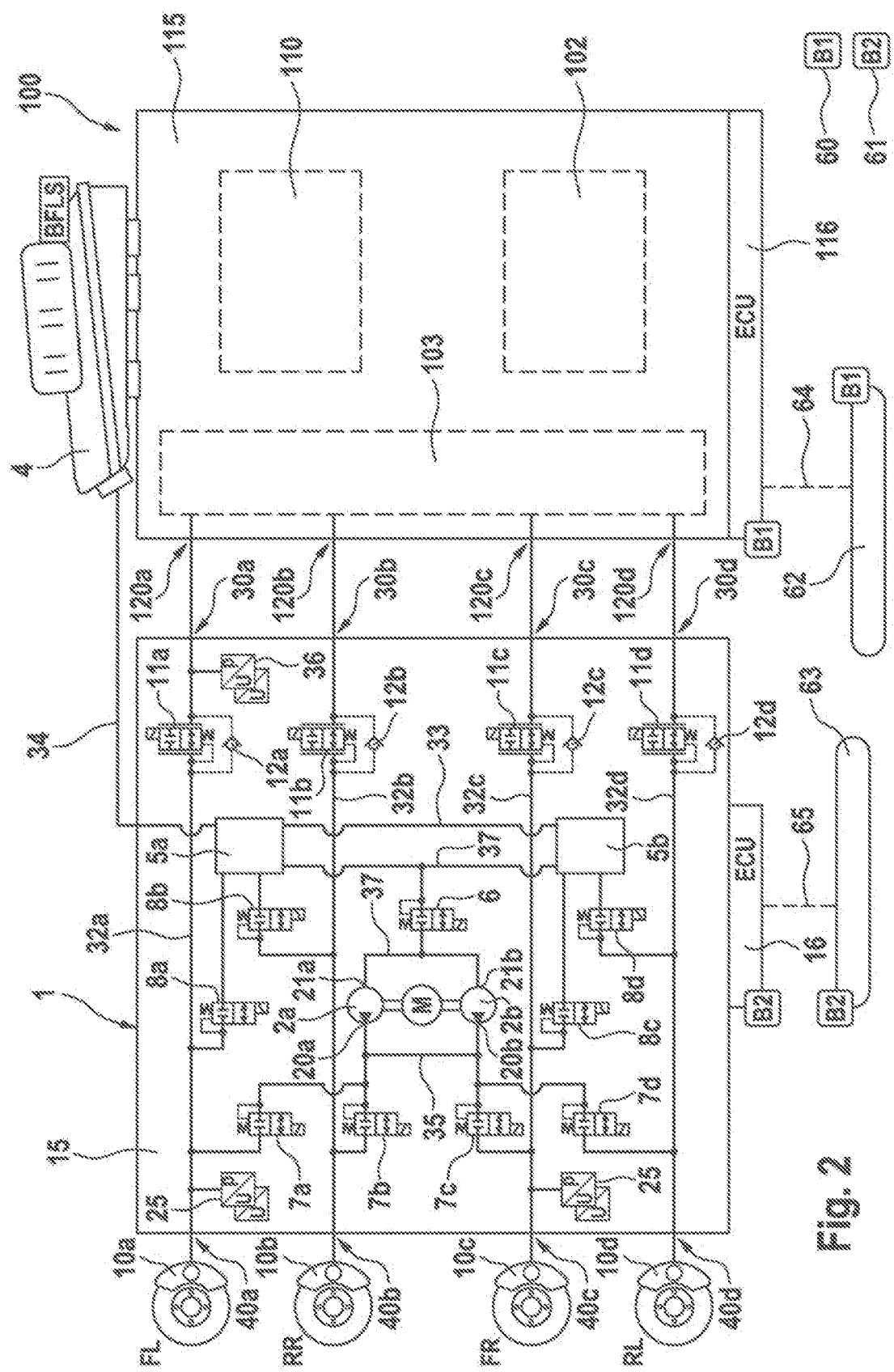
FIG. 2 shows a second exemplary embodiment of a brake system according to the invention.

FIG. 2 schematically illustrates a second exemplary embodiment of a brake system according to the invention. In the brake system in FIG. 2, in contrast to the first exemplary embodiment in FIG. 1, the first pressure side 20*a* of the pump 2*a* and the second pressure side 20*b* of the pump 2*b* are, on the one hand, connected to one another hydraulically via a connecting line 35. Thus, the first pump 2*a* is also connected or can also be connected to the third and the fourth wheel connecting line 32*c*, 32*d*, and the second pump 2*b* is also connected or can also be connected to the first and the second wheel connecting line 32*a*, 32*b*. The second electrohydraulic brake control device 1 can therefore perform a single-circuit pressure buildup.

On the other hand, the second exemplary embodiment differs from the first exemplary embodiment in that the suction side 21*a* of the first pump 2*a* is connected hydraulically to the suction side 21*b* of the second pump. Both suction sides 21*a*, 21*b* are connected to both pressure medium reservoirs 5*a*, 5*b*. Thus, a common connecting line 37 leads from the suction sides 21*a*, 21*b* to the first and the second pressure medium reservoir 5*a*, 5*b*. A single intake valve 6, which is advantageously closed when deenergized, is arranged in the connecting line 37. Both pumps 2*a*, 2*b* can thus each draw in pressure medium from both pressure medium reservoirs 5*a*, 5*b*.

According to the second exemplary embodiment too, an inlet valve 7*a*-7*d*, which is closed when deenergized, and an outlet valve 8a-8d, which is closed when deenergized, are provided for each wheel brake 10-10d in a manner corresponding to the first exemplary embodiment, and therefore individual pressure modulation at each wheel brake 10a-10d is possible.

According to the example, the second brake control device 1 comprises thirteen electrically actuatable valves.

Figure 3:
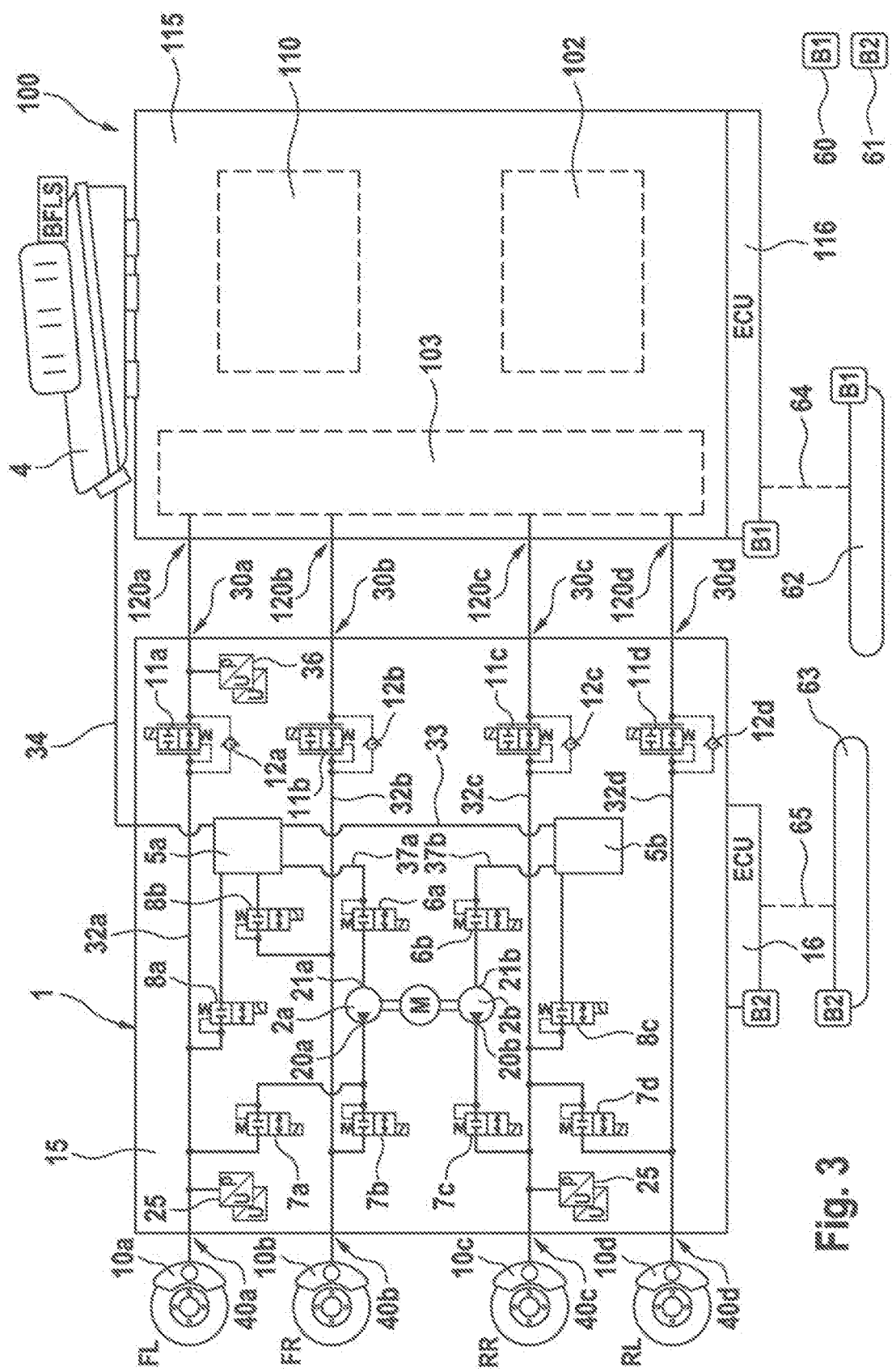
FIG. 3 shows a third exemplary embodiment of a brake system according to the invention.

FIG. 3 schematically illustrates a third exemplary embodiment of a brake system according to the invention. This differs from the first exemplary embodiment in respect of the hydraulic attachment of the fourth wheel brake 10d to the second pressure side 20b and to the second pressure medium reservoir 5b. Moreover, the wheel brakes 10a (associated with wheel connecting line 32a) and 10b (associated with wheel connecting line 32b) assigned to the first pump 2a are assigned to the left-hand front wheel FL and the right-hand front wheel FR, and the wheel brakes 10c (associated with wheel connecting line 32c) and 10d (associated with wheel connecting line 32d) assigned to the second pump 2b are assigned to the right-hand rear wheel RR and the left-hand rear wheel RL (axlewise circuit split).

Whereas, according to the first exemplary embodiment, the pressure side 20b of the pump 2b is connected to the third wheel connecting line 32c of the (third) wheel brake 10c via the inlet valve 7c and is connected to the fourth wheel connecting line 32d of the (fourth) wheel brake 10d via the inlet valve 7d, according to the third exemplary embodiment the second pressure side 20b is connected to the third wheel connecting line 32c via the third inlet valve 7c, and the third wheel connecting line 32c is connected to the fourth wheel connecting line 32d via the fourth inlet valve 7d. Thus, the fourth wheel brake 10d is connected to the third wheel connecting line 32c via the fourth inlet valve 7d and thus, via the third inlet valve 7c, to the second pressure side 20b. Wheel brake 10d is not connected (directly) via a single inlet valve 7d to the pressure side 20b of the second pump 2b (as in FIG. 1).

Moreover, according to the third exemplary embodiment, no (direct) hydraulic connection is provided between the fourth wheel connecting line 32d and the second pressure medium reservoir 5b (that is to say also no fourth outlet valve 8d). The third wheel connecting line 32c or the wheel brake 10c is connected (directly) to the second pressure medium reservoir 5b via the third outlet valve 8c. Thus, however, wheel connecting line 32d or wheel brake 10d is connected or can be connected to the third wheel connecting line 32c via the inlet valve 7d and thus, via the third outlet valve 8c, to the second pressure medium reservoir 5b.

The brake system according to the example, shown in FIG. 3, offers the advantage that a dual-circuit pressure buildup is possible by means of the second brake control device 1. In this case, separate pressure modulation at the two wheel brakes 10a, 10b is possible on the front axle (FL, FR). Pressure modulation takes place (jointly) at both wheels on the rear axle (RR, RL). Each pump 2a, 2b has access to a (dedicated) internal pressure medium reservoir. According to the example, the second brake control device 1 comprises thirteen electrically actuatable valves.

Figure 4:
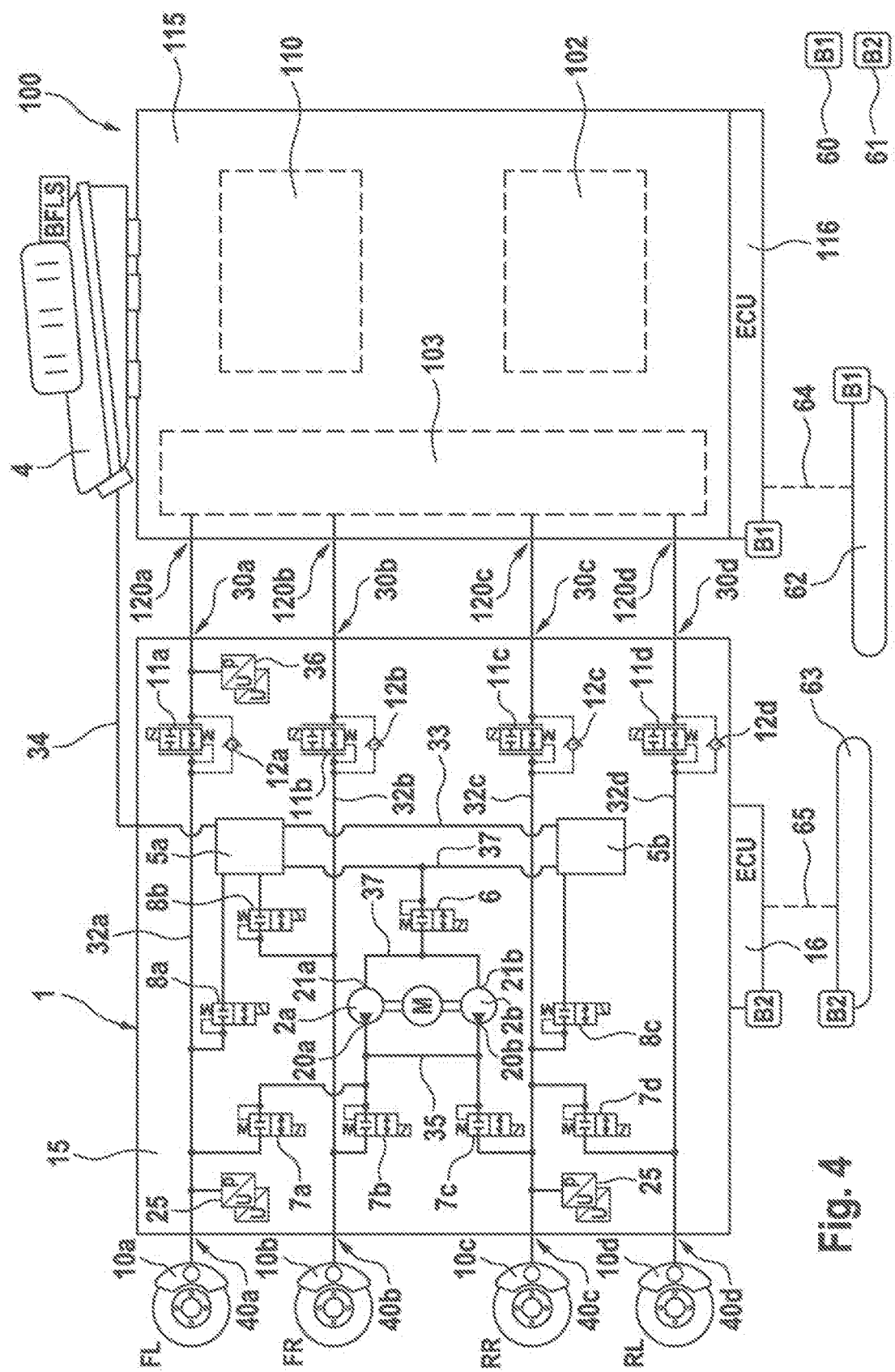
FIG. 4 shows a fourth exemplary embodiment of a brake system according to the invention.

FIG. 4 schematically illustrates a fourth exemplary embodiment of a brake system according to the invention. This differs from the third exemplary embodiment in FIG. 3, on the one hand, in that the first pressure side 20a of the pump 2a and the second pressure side 20b of the pump 2b are connected to one another hydraulically via a connecting line 35 and, on the other hand, in that the suction sides 21a, 21b are connected hydraulically and connected to the two pressure medium reservoirs 5a, 5b via an intake valve 6, which is closed when deenergized (corresponding to the second exemplary embodiment).

The brake control device 1 according to the example can therefore perform a single-circuit pressure buildup. Both pumps 2a, 2b can each draw in pressure medium from both pressure medium reservoirs 5a, 5b. As in the third exemplary embodiment, separate pressure modulation at the two wheel brakes 10a, 10b is possible on the front axle (FL, FR). Pressure modulation takes place (jointly) at both wheels on the rear axle (RR, RL). According to the example, the brake control device 1 comprises twelve electrically actuatable valves.

Figure 5:
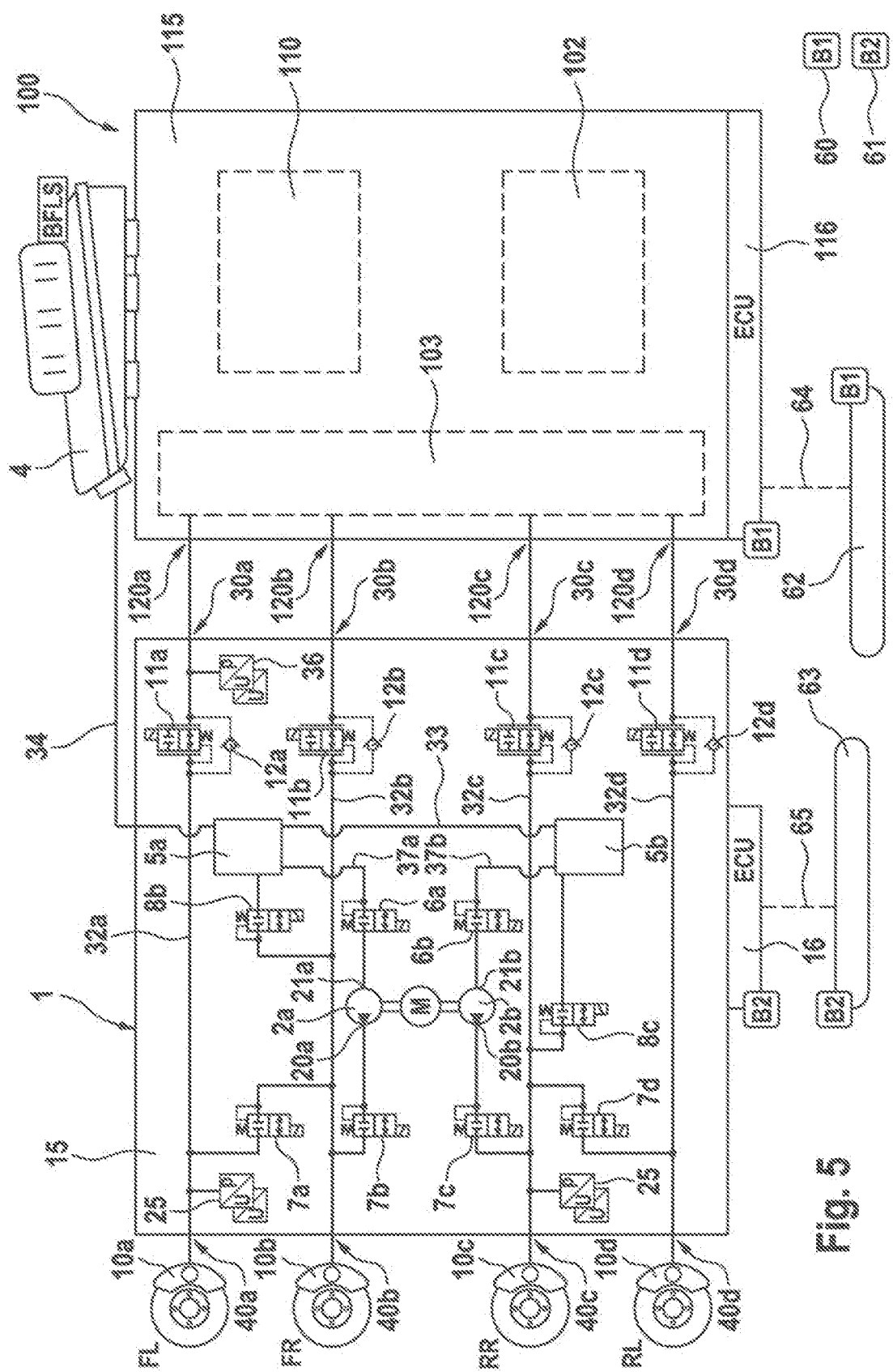
FIG. 5 shows a fifth exemplary embodiment of a brake system according to the invention.

FIG. 5 schematically illustrates a fifth exemplary embodiment of a brake system according to the invention. It differs from the third exemplary embodiment in FIG. 3 in respect of the hydraulic attachment of the first wheel brake 10a to the first pressure side 20a and to the first pressure medium reservoir 5a. The attachment of the first wheel brake 10a to pump 2a and pressure medium reservoir 5a corresponds to the attachment, explained with reference to FIG. 3, of the fourth wheel brake 10d to pump 2b and pressure medium reservoir 5b.

Accordingly, the pressure side 20a is connected to the second wheel connecting line 32b via the second inlet valve 7b, and the second wheel connecting line 32b is connected to the first wheel connecting line 32a via the first inlet valve 7a. Thus, the first wheel brake 10a is connected to the second wheel connecting line 32b via the first inlet valve 7a and then, via the second inlet valve 7b, to the first pressure side 20a. Wheel brake 10a is not connected (directly) via a single inlet valve 7a to the pressure side 20a of the first pump 2a (as in FIG. 1 or 3, for example).

Moreover, according to the fifth exemplary embodiment, no (direct) hydraulic connection is provided between the first wheel connecting line 32a and the first pressure medium reservoir 5a (that is to say also no first outlet valve 8a). The second wheel connecting line 32b or the wheel brake 10b is connected (directly) to the pressure medium reservoir 5a via the second outlet valve 8b. Thus, however, wheel connecting line 32a or wheel brake 10a is connected or can be connected to the second wheel connecting line 32b via the inlet valve 7a and furthermore, via the second outlet valve 8b, to the first pressure medium reservoir 5a.

The brake control device 1 in FIG. 5 allows a dual-circuit pressure buildup. Pressure modulation at both wheel brakes 10a, 10b takes place (jointly) on the front axle (FL, FR). Pressure modulation likewise takes place (jointly) at both wheel brakes 10c, 10d on the rear axle (RR, RL). Each pump 2a, 2b has access to a (dedicated) internal pressure medium reservoir. According to the example, the second brake control device 1 comprises twelve electrically actuatable valves.

Figure 6:
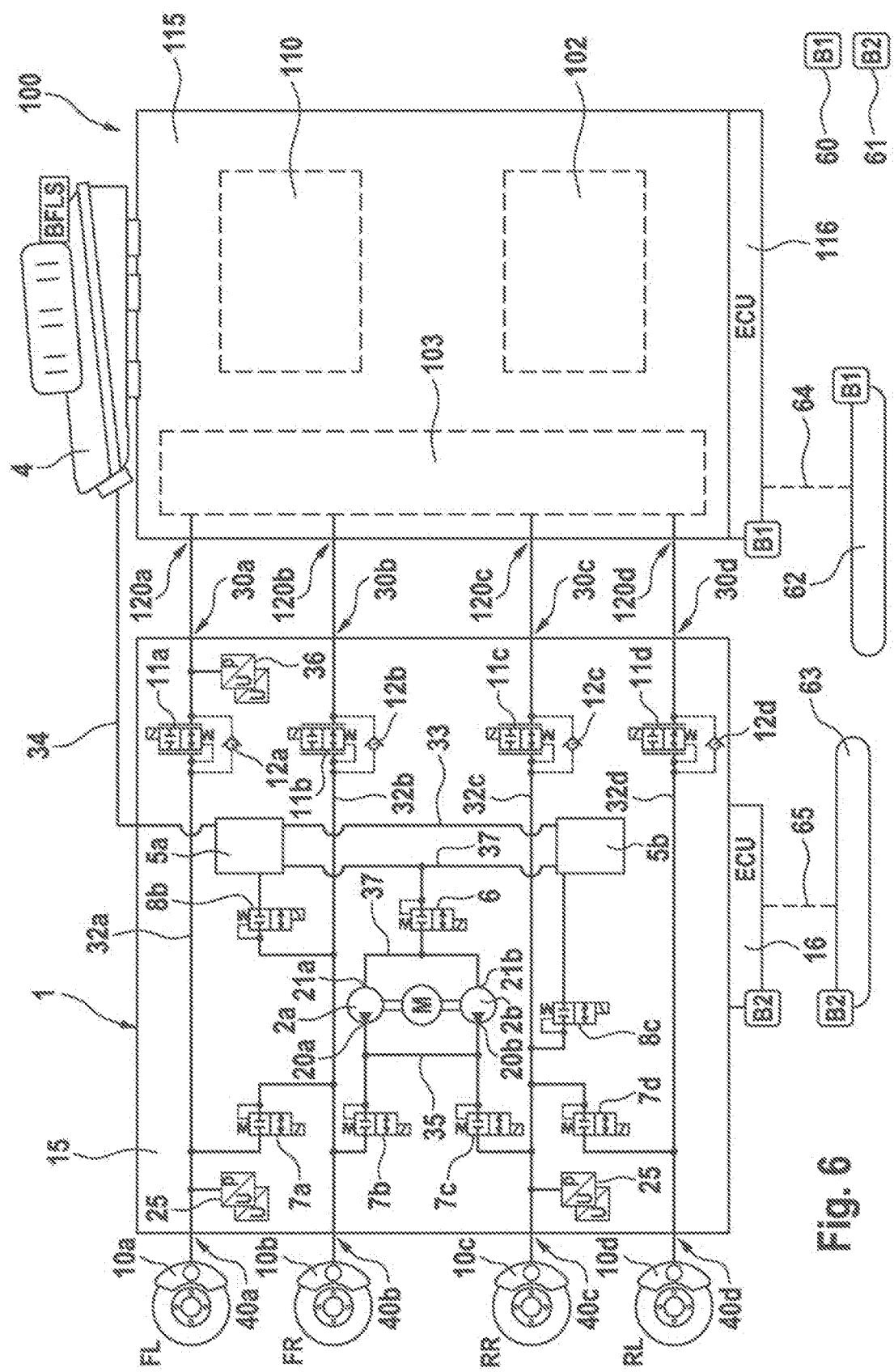
FIG. 6 shows a sixth exemplary embodiment of a brake system according to the invention.

FIG. 6 schematically illustrates a sixth exemplary embodiment of a brake system according to the invention. This corresponds to the fifth exemplary embodiment in respect of the hydraulic attachment of the wheel brakes 10a, 10b and 10c, 10d on each axle to the associated pump 2a, 2b (i.e. the arrangement of the inlet valves 7a-7d) and in respect of the presence of just one outlet valve 8b or 8c per pump 2a, 2b or per pressure medium reservoir 5a, 5b. In contrast to the fifth exemplary embodiment (in a manner corresponding to the exemplary embodiments in FIGS. 2 and 4), a hydraulic connection 35 of the pressure sides 20a and 20b and the common hydraulic connection 37 (in which the intake valve 6 is arranged) are provided between the suction sides 21a, 21b and the pressure medium reservoirs 5a, 5b.

The brake control device 1 in FIG. 6 allows a single-circuit pressure buildup. Both pumps 2a, 2b can each draw in pressure medium from both pressure medium reservoirs 5a, 5b. Pressure modulation at both wheel brakes 10a, 10b takes place (jointly) on the front axle (FL, FR). Pressure modulation likewise takes place (jointly) at both wheel brakes 10c, 10d on the rear axle (RR, RL). According to the example, the brake control device 1 comprises just eleven electrically actuatable valves.

As an option, a respective check valve 12a-12d opening in the direction of the wheel brake 10a-10d can be connected in parallel with each of the isolating valves 11a-11d in each of the six exemplary embodiments in FIGS. 1 to 6.

The second brake control device 1 is preferably embodied without check valves 12a-12d if the upstream first brake control device 100 is embodied in such a way that, in a deenergized state of the first brake control device 100, the driver can build up a brake pressure at the wheel-specific outlets 120a-120d, i.e. has direct hydraulic access to the wheel brakes 10a-10d, e.g. by means of a brake master cylinder that can be actuated with a brake pedal. In this case, it is permissible for the brake control device 1 not to have any check valves 12a-12d that permit the driver to make a direct braking input into the wheel brakes 10a-10d when the isolating valves 11a-11d of the second brake control device 1 are closed, e.g. in an autopilot operating mode. This ensures that the driver is decoupled from the wheel brakes in the autopilot operating mode.

The second brake control device 1 is preferably embodied with the check valves 12a-12d if the upstream first brake control device 100 is embodied in such a way that, in a deenergized state of the first brake control device 100, the driver cannot build up a brake pressure at the wheel-specific outlets 120a-120d, i.e. does not have direct hydraulic access to the wheel brakes 10a-10d. This would be the case, for example, if one or more isolating valves that were closed when deenergized were arranged between a brake master cylinder that could be actuated by a brake pedal and the wheel-specific outlets 120a-120d.

In all the exemplary embodiments, the pressure side 20a of the first pump 2a is connected directly to (at least) the (second) wheel brake 10b via the (second) inlet valve 7b, which is closed when deenergized, while the pressure side 20b of the second pump 2b is connected directly to (at least) the (third) wheel brake 10c via the (third) inlet valve 7c, which is closed when deenergized. In the first to fourth exemplary embodiment in FIGS. 1 to 4, the pressure side 20a of the first pump 2a is connected directly to the (second) wheel brake 10b via the (second) inlet valve 7b, which is closed when deenergized, and to the (first) wheel brake 10a via the (first) inlet valve 7a, which is closed when deenergized, while the pressure side 20b of the second pump 2b is connected directly to the (third) wheel brake 10c via the (third) inlet valve 7c, which is closed when deenergized, and to the (fourth) wheel brake 10d via the (fourth) inlet valve 7d, which is closed when deenergized. The term "connected directly via the inlet valve" is interpreted to mean that there is no further switchable valve in the hydraulic connection between the pressure side and the wheel brake. A highly dynamic pressure change is thereby possible at the respective wheel brakes mentioned since the flow resistance of the connection between the pressure side and the wheel brake is low.

Common to the brake systems in the exemplary embodiments in FIGS. 1 to 6 is the fact that there are relatively few valves and yet a large number of braking functions with wheel-specific brake pressures at all four wheels can be carried out.

If a pressure modulation takes place jointly at both wheels on one axle, this preferably occurs in accordance with the "select-low" principle, which is known per se. During this process, the modulation of the brake pressure at the axle takes place in accordance with the wheel that has the respectively poorest adhesion (greatest slip, lowest linear wheel speed).

The invention claimed is:

1. A brake system for motor vehicles comprising:
   at least four hydraulically actuatable wheel brakes,
   a main pressure medium reservoir, which is at atmospheric pressure,
   a first electrohydraulic brake control device, which, for each of the four wheel brakes, comprises a wheel-specific outlet, and
   a second electrohydraulic brake control device, which, for each of the four wheel brakes, comprises a wheel-specific inlet, which is connected to the wheel-specific outlet, assigned to the wheel brake, of the first brake control device, a wheel-specific wheel outlet, which is connected to the wheel brake, and a hydraulic wheel connecting line, which connects the inlet to the wheel outlet,
   wherein,
   the second brake control device comprises a first pump with a first pressure side and a first suction side, wherein the first pressure side is connected to a first and a second wheel connecting line of the four wheel connecting lines, and a second pump with a second pressure side and a second suction side, wherein the second pressure side is connected to a third connecting line and a fourth wheel connecting line, and wherein the second brake control device comprises at least one first and one second pressure medium reservoir under atmospheric pressure, which are integrated into the second brake control device.

2. The brake system as claimed in claim 1, wherein the second brake control device comprises an inlet valve, closed when deenergized, for each of the at least four hydraulically actuatable wheel brakes.

3. The brake system as claimed in claim 1, wherein the pressure side of each of the pumps is connected directly to at least one of the wheel brakes via an inlet valve which is closed when deenergized.

4. The brake system as claimed in claim 1, wherein the first and the second pressure medium reservoir are connected to the main pressure medium reservoir.

5. The brake system as claimed in claim 4, wherein the first suction side is connected to the first pressure medium reservoir via a first intake valve, and the second suction side is connected to the second pressure medium reservoir via a second intake valve.

6. The brake system as claimed in claim 1, wherein the first suction side and the second suction side are connected to the first and the second pressure medium reservoir via a single intake valve.

7. The brake system as claimed in claim 1, wherein the first pressure side is connected to the first wheel connecting line via a first inlet valve and to the second wheel connecting line via a second inlet valve.

8. The brake system as claimed in claim 7, wherein the first wheel connecting line is connected to the first pressure medium reservoir via a first outlet valve, and the second wheel connecting line is connected to the first pressure medium reservoir via a second outlet valve.

9. The brake system as claimed in claim 1, wherein the second pressure side is connected to the third wheel connecting line via a third inlet valve and to the fourth wheel connecting line via a fourth inlet valve.

10. The brake system as claimed in claim 9, wherein the third wheel connecting line is connected to the second pressure medium reservoir via a third outlet valve, and the fourth wheel connecting line is connected to the second pressure medium reservoir via a fourth outlet valve.

11. The brake system as claimed in claim 1, wherein the second pressure side is connected to the third wheel connecting line via a third inlet valve and in that the third wheel connecting line is connected to the fourth wheel connecting line via a fourth inlet valve.

12. The brake system as claimed in claim 11, wherein the third wheel connecting line is connected to the second pressure medium reservoir via a third outlet valve.

13. The brake system as claimed in claim 1, wherein the first pressure side is connected to the second wheel connecting line via a second inlet valve and in that the second wheel connecting line is connected to the first wheel connecting line via a first inlet valve.

14. The brake system as claimed in claim 13, wherein the second wheel connecting line is connected to the first pressure medium reservoir via a second outlet valve.

15. The brake system as claimed in claim 2, wherein the pressure side of each of the pumps is connected directly to at least one of the wheel brakes via an inlet valve which is closed when deenergized.

16. A brake system for motor vehicles comprising:
   at least four hydraulically actuatable wheel brakes,
   a main pressure medium reservoir, which is at atmospheric pressure,
   a first electrohydraulic brake control device, which, for each of the four wheel brakes, comprises a wheel-specific outlet, and
   a second electrohydraulic brake control device, which, for each of the four wheel brakes, comprises a wheel-specific inlet, which is connected to the wheel-specific outlet, assigned to the wheel brake, of the first brake control device, a wheel-specific wheel outlet, which is connected to the wheel brake, and a hydraulic wheel connecting line, which connects the inlet to the wheel outlet, wherein, the second brake control device comprises a first pump with a first pressure side and a first suction side, wherein the first pressure side is connected to a first and a second wheel connecting line of the four wheel connecting lines, and a second pump with a second pressure side and a second suction side, wherein the second pressure side is connected to a third and a fourth wheel connecting line, and wherein the first pressure side is additionally directly connected hydraulically to the second pressure side.

17. A brake system for motor vehicles comprising:
   at least four hydraulically actuatable wheel brakes,
   a main pressure medium reservoir, which is at atmospheric pressure,
   a first electrohydraulic brake control device, which, for each of the four wheel brakes, comprises a wheel-specific outlet, and
   a second electrohydraulic brake control device, which, for each of the four wheel brakes, comprises a wheel-specific inlet, which is connected to the wheel-specific outlet, assigned to the wheel brake, of the first brake control device, a wheel-specific wheel outlet, which is connected to the wheel brake, and a hydraulic wheel connecting line, which connects the inlet to the wheel outlet, wherein, the second brake control device comprises a first pump with a first pressure side and a first suction side, wherein the first pressure side is connected to a first and a second wheel connecting line of the four wheel connecting lines, and a second pump with a second pressure side and a second suction side, wherein the second pressure side is connected to a third and a fourth wheel connecting line, and wherein the first suction side is directly connected hydraulically to the second suction side.

* * * * *